Figure 1:
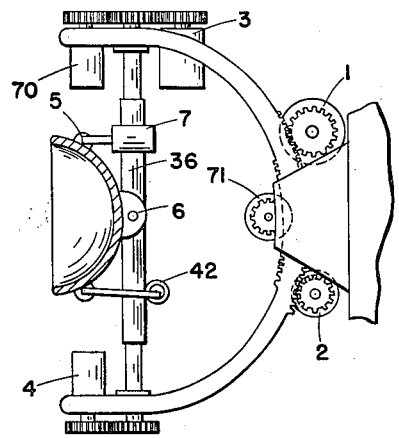

Feb. 19, 1963 S. M. BRAININ 3,078,455
SPACE STABILIZATION OF A SEARCH PATTERN
Filed May 10, 1954 5 Sheets-Sheet 1

*INVENTOR.*
SAMUEL M. BRAININ
BY William R. Lane
ATTORNEY

INVENTOR.
SAMUEL M. BRAININ

*INVENTOR.*
SAMUEL M. BRAININ

BY *William R. Lane*

ATTORNEY

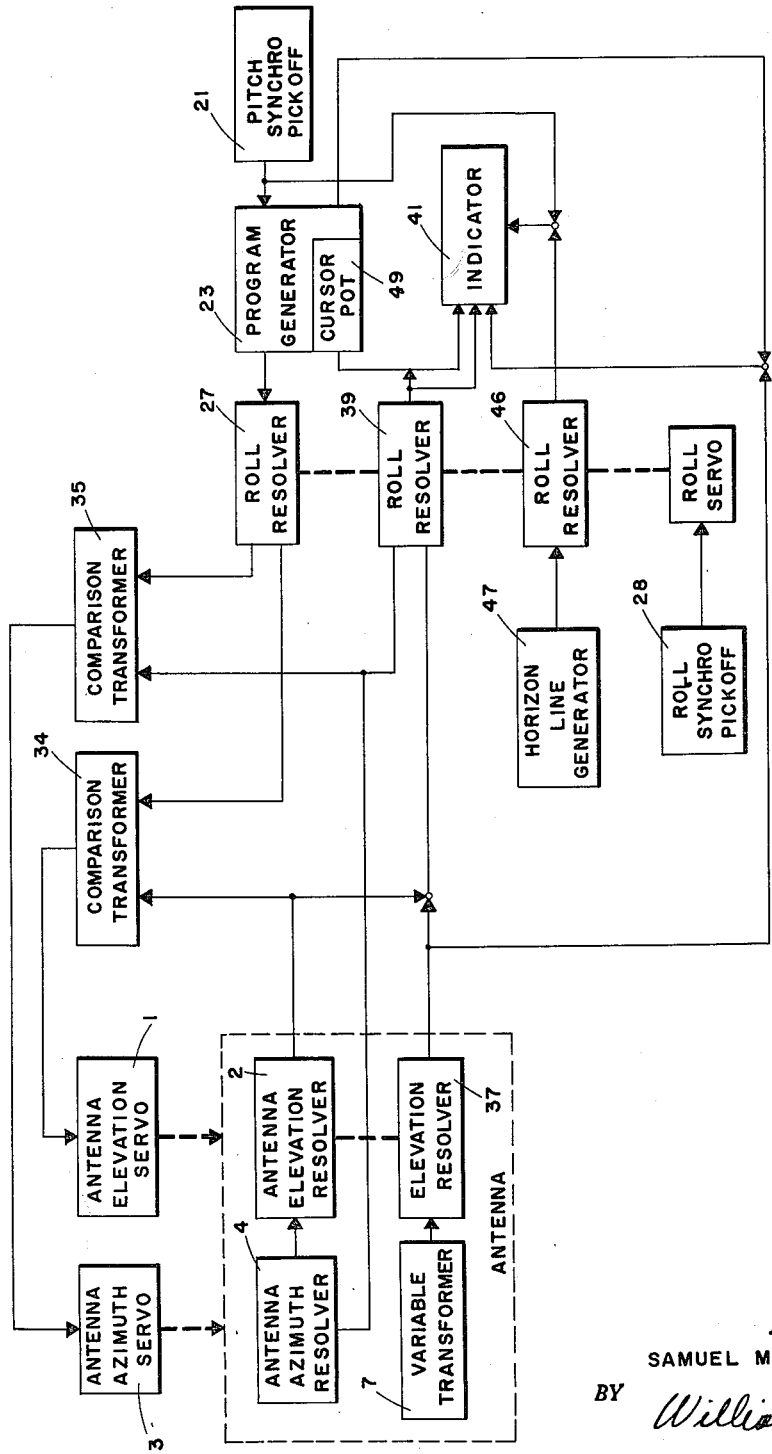

*INVENTOR.*
SAMUEL M. BRAININ
BY
*William R. Lane*
ATTORNEY

United States Patent Office 3,078,455
Patented Feb. 19, 1963

3,078,455
SPACE STABILIZATION OF A SEARCH PATTERN
Samuel M. Brainin, Whittier, Calif., assignor to
North American Aviation, Inc.
Filed May 10, 1954, Ser. No. 428,767
17 Claims. (Cl. 343—7)

This invention relates to a simplified scheme of stabilizing in space the search pattern of a directable device carried in a vehicle. More particularly, it relates to a method of directing the sweep of a radar antenna in elevation and azimuth, and, further, providing a display of the radar signals stabilized in pitch and roll upon an indicator. The signals used to direct the antenna can also be used, of course, to direct armament.

The broad problem is to drive a scanning device such as an antenna in accordance with a programmed search. The term "space stabilization" infers that the radar antenna is driven independently of, and the indicator display is unaffected by, maneuvers and angular motions of the carrying vehicle, such as an aircraft.

Stabilization of an antenna in space, that is, directing it independently of the maneuvers of the aircraft, requires having due regard for the oscillating motion of the antenna parabola, the two degrees of drive (azimuth and elevation) of the antenna with respect to the airframe and the pitch, roll, and yaw of the airframe.

It can be seen that while an airplane maneuvers, several transformations of the antenna drive signals are required in order to cause the antenna to follow a given search pattern and several more inverse transformations are necessary in order to visually locate in azimuth and elevation the information received by the radar indicator from the antenna. Generally, such transformations are accomplished by resolvers mounted to determine angles between the antenna and the airframe and other resolvers or pick-offs which receive roll, pitch and yaw information of the airframe and transform signals accordingly. The angular motions of the airframe are determined from a reference, such as a gyroscope. Because of the complexity and cost of the necessary equipment, stabilization in yaw is not acquired in this system. Therefore, this system disregards error introduced by reason of the yaw of the airframe. This reduces the number of transformations necessary. The reference can now be a single gyro vertical from which is obtained signals as to the roll and pitch of the airframe. The transformations, then involve those for the pitch and roll of the airframe, the motion of the antenna in elevation and azimuth relative to the airframe, and oscillation of the antenna parabola.

Choice of a novel search pattern provides considerable simplification in equipment.

Another simplification is the simultaneous use of antenna transformation resolvers for both servo control and indicator display.

It is therefore a principal object of this invention to provide a system of stabilizing a scanner search pattern in space.

It is a further object of this invention to provide a system of programming a desired search and driving a scanner to follow the program.

It is another object of this invention to provide a method of displaying space stabilized information received from a radar antenna.

It is still another object of this invention to aim a directable device independently of the pitch and roll of the airframe.

Figure 2:
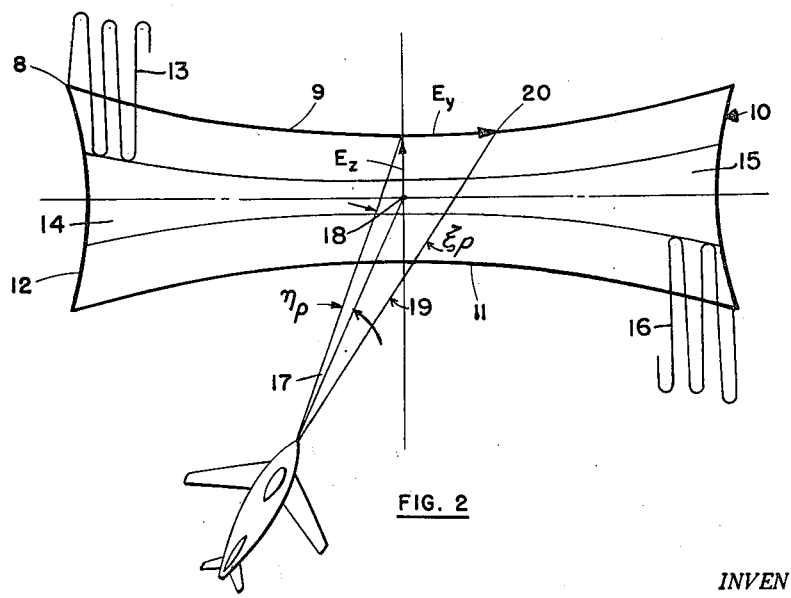
Figure 3:
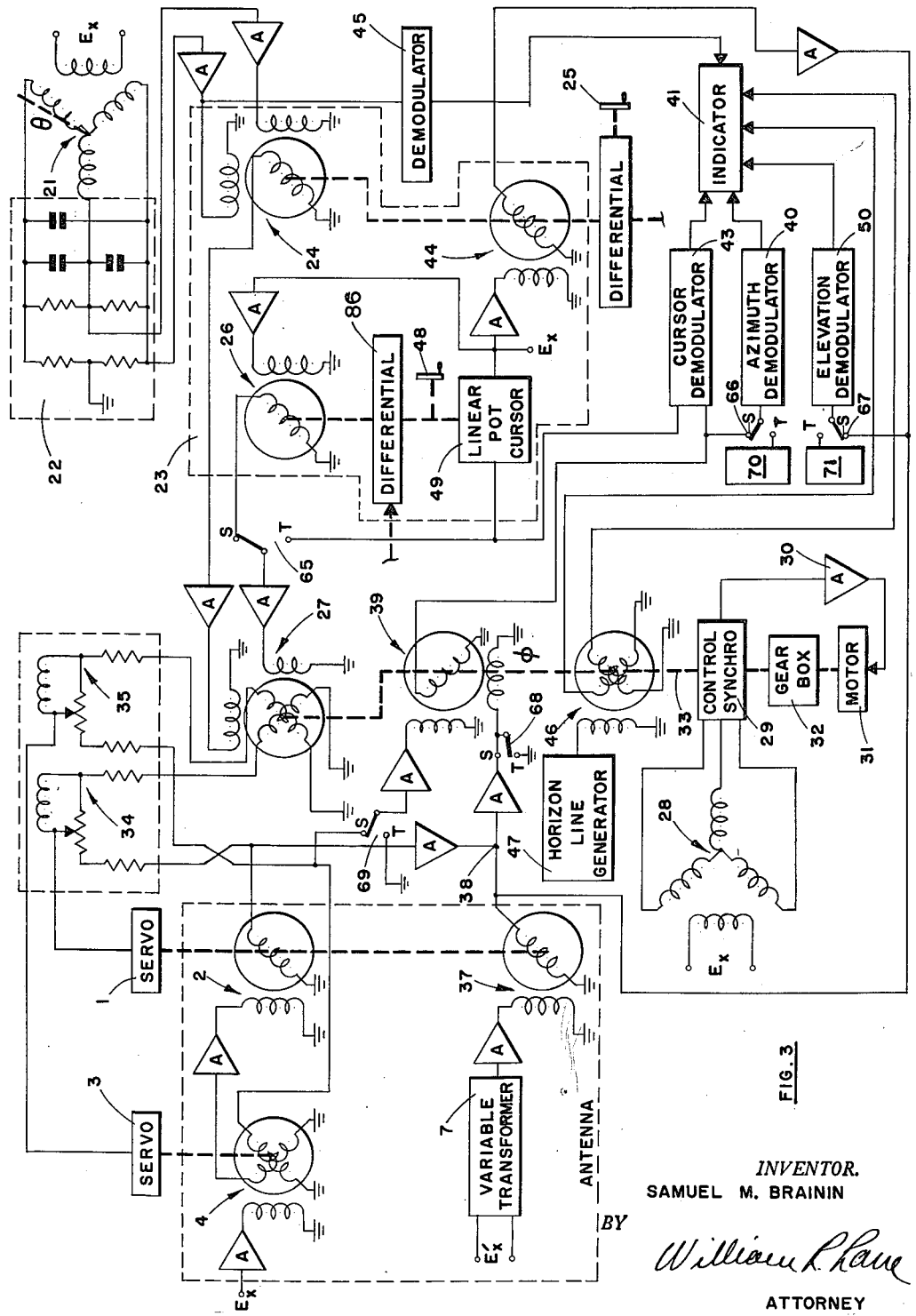
Figure 4:
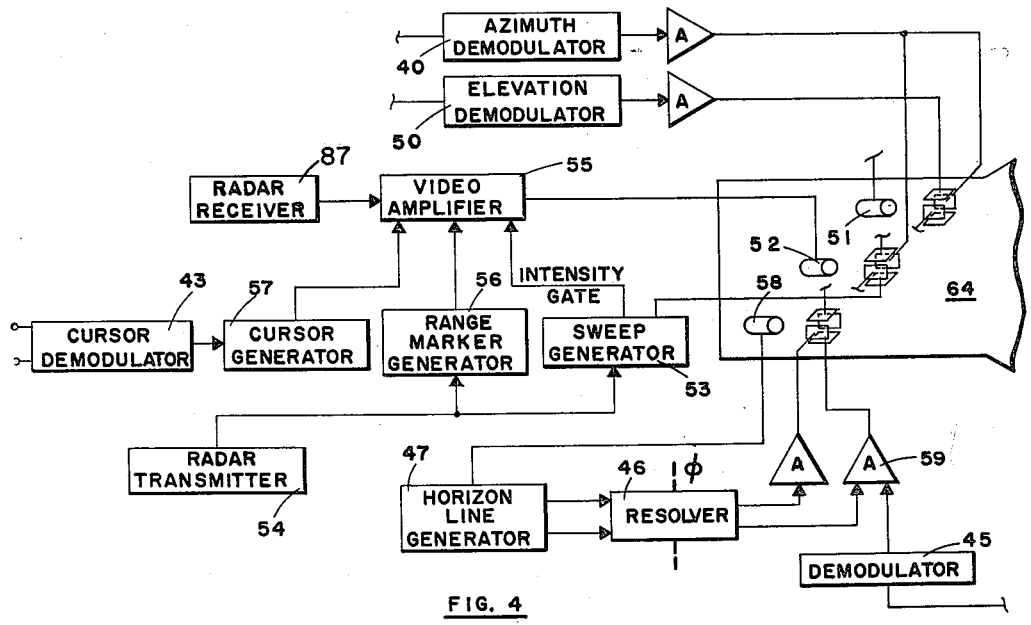
Figure 5:
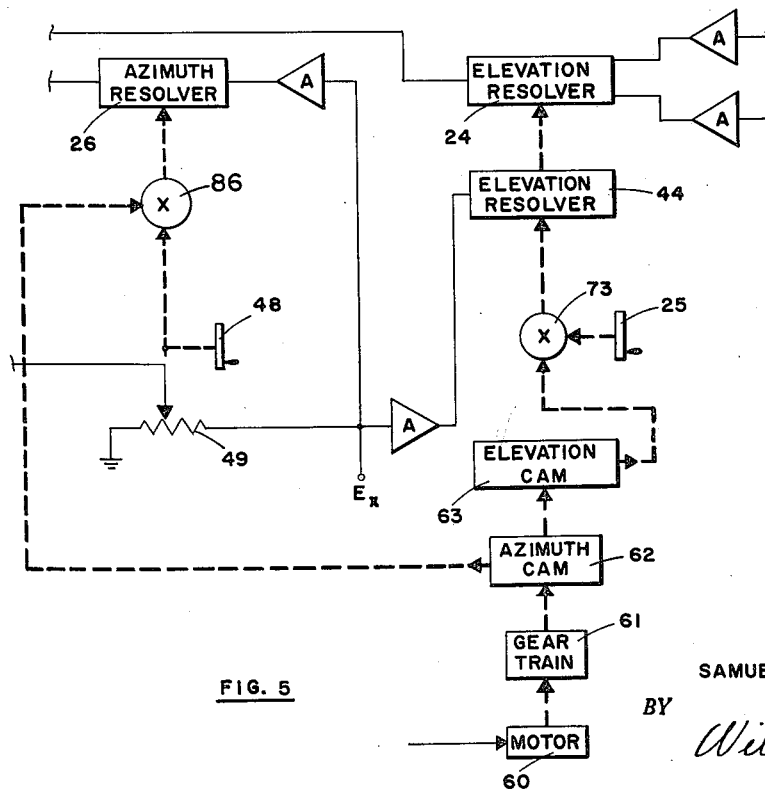
Figure 6:
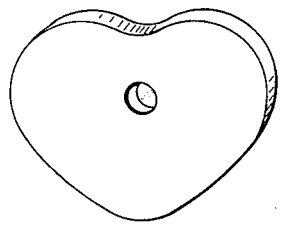
Figure 7:
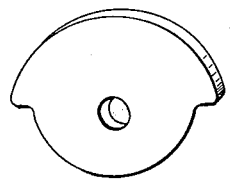
Figure 9:
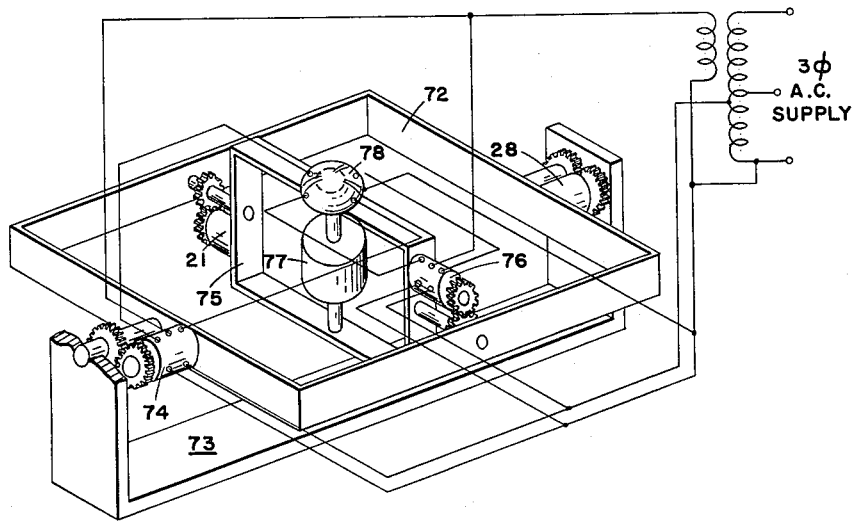
Figure 10:
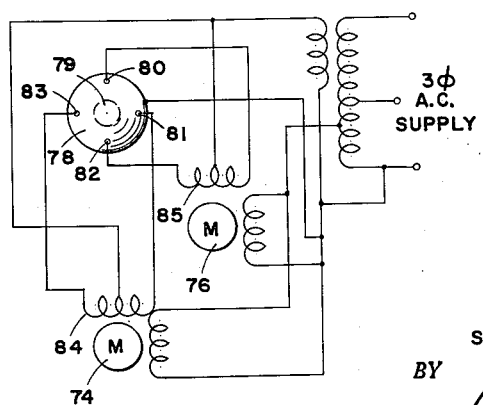

Other objects of invention will become apparent from the following description taken in connection with the accompanying drawings, in which FIG. 1 is a side view of an antenna;
FIG. 2 is a representation of the novel search pattern used in this method of stabilization;
FIG. 3 is a diagram of the device of the invention;
FIG. 4 is a more detailed schematic of the indicator portion;
FIG. 5 is a diagram of the search programmer;
FIG. 6 is an azimuth cam;
FIG. 7 is an elevation cam;
FIG. 8 is a simplified block diagram of the device of the invention;
FIG. 9 is a diagram of a rudimentary gyro vertical; and
FIG. 10 is a schematic of the erecting current of the gyro vertical.

In order to explain the novel method of search in this invention, it is necessary to consider the mounting of the antenna. FIG. 1 is a rudimentary antenna which illustrates the basic motions. Further detail of an improved antenna mount may be had by reference to Patent No. 2,654,031, issued September 29, 1953, in the names of W. D. Mullins, Jr., et al., for "Antenna Mount." In the figure, servo 1 drives the antenna in elevation according to received signals. Elevation resolver 2 is rotated according to the elevation of the antenna. Servo 3 drives the antenna in azimuth according to received signals. Azimuth resolver 4 is rotated according to the azimuth of the antenna. For additional coverage, parabola 5 is made to oscillate about axis 6 and linear differential variable transformer 7, also known by the name "Schaevitz transformer" generates a signal in accordance with the oscillations of the parabola. The oscillation of the parabola is forced by sine scan drive 42.

In order to visualize the search pattern, consider the airplane of FIG. 2 as being at the center of a sphere which encloses it. FIG. 2 is an approximate representation of the antenna sweep of the spherical sector, as viewed by a person located on an equatorial plane within the sphere. The mean motion of the radar antenna comences at point 8, sweeps along line 9, down line 10, back on line 11, and to the commencement on line 12. These lines are projections of the antenna sweep on the sphere which is considered to enclose the airplane. It is significant that lines 9, 10, 11, and 12 are all arcs of small circles upon the fictitious sphere, similar to lines of latitude on the earth. The area of search, therefore, rises or drops to a peak at the corners, whereas in previous systems the lines converged so that the pattern tended to round off at the corners.

In addition to the drive in elevation and azimuth, the reflecting parabola of the radar antenna is impressed with an oscillating motion termed sine scan. Since scan motion is indicated at 13 in FIG. 2 which is the line the parabola follows in its scan along the mean path, lines 9, 10, 11 and 12. It can be seen how the particular area to be searched is covered by the motion of the antenna. In order to cover the entire area and not leave gaps, such as 14 and 15, of unsearched area, the sine scan motion 13 may be made to overlap the return sine scan motion 16. The longitudinal axis of the airframe is indicated at 17 directed toward point 18 within the scanned area. The line of sight 19 of the radar antenna is defined by two angles, the azimuth angle to which the antenna is desired, or programmed, to be driven is $\xi p$, and the elevation angle to which it is desired, or programmed, to be driven is $\eta p$. The azimuth angle as shown is defined from the line joining the tip of the $E_z$ component with the aircraft to the line 19. The elevation angle as shown is defined from the longitudinal axis of the airframe. These angles are subtended by distances $E_y$ and $E_z$, respectively.

The equations of the antenna position are:

(1) $\quad E_y = E_x \sin \xi\rho$ (2) $\quad E_z = E_x \sin \eta\rho$ where $E_x$ is an appropriate, arbitray, scalar fixed value which represents the slant range of the radar. The formulas representing instantaneous position of the antenna in the search patterns of other systems are more complicated.

Suppose, now, it is desired to remove all effects of the pitching of the aircraft and cause the radar antenna to remain aimed at point 20. It can be seen that any pitching motion of the airframe will not affect the $E_y$ component, i.e., azimuth motion, and that correction need only be made to the elevation component, $E_z$. The signal, therefore, which drives the antenna to the desired angle of elevation is corrected by the amount of pitch the airplane experiences. This is merely a matter of using resolvers to subtract the desired angle of elevation ($\eta\rho$) from the pitch angle of the airplane ($\theta$). This correction then provides drive information to the antenna unaffected by the pitching of the airframe. In other words, this information is pitch stabilized. FIG. 3 indicates how pitch stabilized elevation is obtained. A gyro vertical such as is illustrated in FIGS. 9 and 10 may be used to provide signals as to the roll and pitch of the airframe. The outer gimbal 72 is rotatably driven with respect to airframe mounting structure 73 by two-phase induction motor 74. The inner gimbal 75 is rotatably mounted with respect to the outer gimbal 72 by two-phase induction motor 76. Inner gimbal 75 provides mounting for the gyroscope rotor 77 and bubble level cell 78. Two-phase, reversible motors 74 and 76 are driven according to bubble level cell 78 to hold the spin axis of rotor 77 vertical. Circuit connections are illustrated in FIG. 10, looking down upon bubble level cell 78 and the bubble indicated by dotted lines 79. The case of the cell is connected to one side of the three-phase A.-C. supply and the other four electrodes 80, 81, 82 and 83 are connected to the quadrature windings 84 and 85 of the two-phase motors 74 and 76. As the gyro spin axis deviates from vertical, bubble 79 reduces the conductivity between respective electrodes and the case and causes the respective quadrature winding to have a net flux which causes the respective motor to rotate its gimbal until the bubble 79 is again centered.

In FIG. 9, two pick-off synchros 21 and 28 are shown. These synchros, when excited by an A.-C. exciting voltage $E_x$, provide a three-phase (space-wise) signal varying according to the pitch and roll of the airframe. Referring again to FIG. 3, from the pick-off coil 21 of the pitch synchro of a gyro vertical is received a three-phase output of an isolated A.-C. exciting voltage $E_x$ which is varied according to airframe pitch. A two-phase output according to the cosine and sine of the pitch angle is obtained by network 22 which, by resistors and capacitors provides $E_x \sin \theta$ and $E_x \cos \theta$. These two voltages are amplified and enter the programmer 23 as exciting voltages for resolver 24 into which the pilot sets, by control 25, the elevation angle to which he desires the antenna to sweep relative to the airframe. The shaft of resolver 24 is rotated according to the programmed pattern in elevation. The programmed, or desired, elevation signal is thus pitch stabilized. That is, the elevation angle to which the antenna will be driven, as it follows its programmed sweep, is not influenced by the pitching motion $\theta$ of the airframe. The pilot also sets into resolver 26 of the programmer 23 the azimuth angle to which he desires the antenna to sweep. Resolver 26 is externally excited with isolated exciting voltage $E_x$ and its shaft is rotated according to the programmed pattern in azimuth. Its output is, therefore, a signal varying according to desired antenna sweep in azimuth.

The outputs of resolvers 24 and 26 are both fed after amplification to roll resolver 27 which is rotated according to the roll of the airframe. Roll is determined by a signal from the roll synchro pickoff 28 of a gyro vertical. A servo system comprising control synchro 29, amplifier 30, motor 31, and gear box 32 rotates shaft 33 and, thus, resolver 27 in accordance with the roll $\phi$ of the airframe. The output of resolver 27 is, then, a roll and pitch stabilized elevation signal and a roll stabilized azimuth signal. If the antenna is driven to follow these signals, it is substantially unaffected by airframe roll and pitch.

Referring momentarily to FIG. 1 to note that resolvers 2 and 4 are rotated according to the elevation and azimuth angles, respectively, of the antenna relative to the airframe, it can be seen, then, in FIG. 3 that an isolated exciting voltage $E_x$ varied by these resolvers will indicate the antenna aim relative to the airframe as defined in Equations 1 and 2 and FIG. 2. Angle transformation is the desired end, and in order to transmit the varying angle information, an arbitrary A.-C. exciting voltage $E_x$ is varied accordingly.

Thus far has been developed two sets of paired signals. One pair (the stabilized programmed signals) from resolver 27 indicates the desired antenna position and the other pair from resolvers 2 and 4 indicates the actual antenna position. Comparing these signals across static transformers 34 and 35 provides error signals which can be used, in turn, to actuate servo drives 1 and 3. Closed-loop servo control of the search of the antenna is thus acquired. It may be noted that the signal provided by elevation resolver 2 is a function of the position of azimuth resolver 4 in addition to being a function of the elevation angle of the radar antenna. In this way, if the antenna sweeps to the right, referring to FIG. 2, the antenna can be made to hold a given elevation and not drop off at the corner as would ordinarily be expected from the type of gimbal mounting shown in FIG. 1. To accomplish this, the component signal received at resolver 2 from azimuth resolver 4 may be made to decrease as azimuth increases, in order that a large difference signal is received by servo 1.

It is desired, in addition to programming and servo controlling the search of an antenna, that a picture presentation of detected objects be obtained. This requires that the beam sweep of the indicator be synchronized with the sweep of the antenna. Some of the equipment previously described may also provide signals required in indicator presentation.

As explained before, in order to cover the area of a particular space, a sinusoidal motion is undergone by the parabola, or scanner, of the antenna in addition to the previously mentioned azimuth and elevation drives relative to the airframe. This sinusoidal motion is picked off by means of a linear differential variable transformer 7, see FIGS. 1 and 3, mounted on the traverse gimbal 36 of the antenna. Variable transformer 7 is excited by a voltage $E_x'$ in phase with $E_x$ but of smaller appropriate magnitude so that transformer 7 provides suitable output voltage indicating the angle through which the scanner oscillates. The armature of Schaevitz type transformer 7 is adapted to be oscillated by the oscillating motion of the scanner of the antenna. This sine wave motion of the parabola is mostly in elevation. To determine the exact elevated position of the antenna relative to the airframe, a sine scan signal multiplied by the cosine of the elevation angle must be added to the signal of the elevation angle relative to the airframe. Resolver 37 provides a sine scan signal which varies according to the cosine of the elevation angle which is added to the indicated elevation angle at junction 38. To portray this antenna elevation signal on an indicator requires that roll be taken into account. Consequently, the signal passes through roll resolver 39, which multiplies the azimuth signal by the cosine of the roll angle and the elevation signal by the sine of the roll angle and sums such cosine and sine products in order to derive a roll stabilized azimuth signal. The output of resolver 39 is fed to azimuth demodulator 40 which presents to indicator 41 a roll stabilized azimuth sweep synchronized with the antenna. This azimuth sweep is obtained by the output of demodulator 40 driving the horizontal deflection plates of indicator 41. When the airframe rolls, the elevation of the antenna relative to the airframe adds to the sweep in space stabilized azimuth, as previously explained. Therefore, a cursor on an indicator, which presents a trace whenever the antenna sweeps through a selected space stabilized azimuth, must also be corrected according to airframe roll. The output of resolver 39 also drives cursor demodulator 43 which, in turn, presents signals which will space stabilize the cursor generated for indicator 41. The azimuth at which the cursor is to be generated is set by the control handle 48 which adjusts linear cursor potentiometer 49. Cursor demodulator 43 is operated so that when the output of the potentiometer 49 and resolver 39 are equal, a signal is presented to indicator 41. Thus, when the antenna passes a chosen azimuth in space, a cursor signal is generated. The cursor is presented on the indicator is, consequently, roll stabilized.

In order to synchronize the beam sweep of the indicator tube in elevation with the elevation of antenna, the sine scan signal component of elevation is taken from resolver 37 and is added to the amplified output of resolver 44 at elevation demodulator 50. The output of this demodulator is a voltage which varies according to programmed elevation, added to the sine scan component of elevation. If the servo loop is tight, that is, if the antenna is driven to follow closely the programmed elevation, the programmed elevation signal is accurate enough to be used in this manner.

A horizon line signal is generated within the indicator, and to correct the signal for the pitch of the airframe, a signal according to the sin θ, pitch angle, is received at demodulator 45 and passed on to the indicator 41. The horizon line is thus pitch stabilized. As the airframe rolls, the horizon line must also roll, in order to correctly indicate the horizon. The signals which will cause the horizon line to roll correctly are the sine and cosine signals of roll which are taken from resolver 46. This resolver receives the horizon line signals from the horizon line generator 47 and roll stabilizes the horizon line for presentation by the indicator 41.

FIG. 8 is a simplified block diagram of certain elements of the system. It corresponds to the schematic of FIG. 3. The desired antenna elevation and azimuth signals of program generator 23 are pitch stabilized by exciting the generator with a signal from pitch synchro pick-off 21. Upon roll stabilizing the programmed signals, comparison can then be made with the indicated antenna elevation and azimuth signals by comparison transformers 34 and 35. Servo drives 1 and 3 cause the antenna to follow the roll and pitch stabilized programmed azimuth and elevation signals. Resolvers 2 and 4, in conjunction with variable transformer 7 and resolver 37, provide indication of antenna azimuth to resolver 39 which furnishes roll resolved, indicated antenna azimuth to indicator 41. A cursor is received by indicator 41 from potentiometer 49. Horizon line generator 47 provides signals to resolver 46 for roll stabilization and the output of resolver 46 is added to the signal from pitch synchro pick-off 21 for pitch stabilization of the horizon line. The signal is then furnished to indicator 41. Indicator 41 receives an antenna elevation signal from program generator 23 and the output of resolver 37.

Further indicator detail is shown in FIG. 4, in which two displays are obtained, an azimuth versus elevation picture indicating antenna aim and a range versus azimuth picture including the target with superimposed cursor and horizon lines. The azimuth and elevation demodulators 40 and 50 are connected, respectively, to the horizontal and vertical deflection plates of gun 51 of the cathode ray tube for C-scope presentation. The beam of gun 51 is then deflected according to the azimuth and elevation of the antenna, and the displayed picture is unaffected by airframe roll or pitch. B-scope presentation of the target in range versus azimuth is obtained from gun 52 whose horizontal deflection plates are connected to azimuth demodulator 40 and whose vertical deflection plates are connected to sweep generator 53. Sweep generator 53 is controlled by the radar transmitter 54 and also provides intensity gate signals to video amplifier 55. The range return signals of the target are received by video amplifier 55 from radar receiver 87 to control the intensity of gun 52 of cathode ray tube 64. Range markers may be superimposed on the picture presented by gun 52 by connecting a range marker generator 56 to video amplifier 55. In addition, the cursor is also superimposed by connecting cursor generator 57 to video amplifier 55. A third gun 58 receives signals from horizon line generator 47. The deflection plates are controlled by signals resolved according to roll by resolver 46. This resolver roll stabilizes the horizon line on the cathode ray tube. Amplifier 59 receives the vertical deflection output from resolver 46 and also receives a bias from demodulator 45 which raises or lowers the horizon line according to the pitch of the airframe.

Previously, a programmer has been referred to, which generates shaft rotations according to a desired sweep of the antenna in azimuth and elevation. FIG. 5 represents a method of programming. A motor 60 rotates gear train 61 and cams 62 and 63. Followers on these cams cause rotation of the azimuth and elevation shafts and rotate resolvers 26, 24 and 44. Gear differential 36 provides for rotation of resolver 26 in accordance with inputs from azimuth cam 62 and cursor control handle 48. Control handle 48 provides for moving the cursor in azimuth. Control handle 25 connected to gear differential 73 provides for raising or lowering the elevation to which the antenna will sweep. The shape of cams 62 and 63, of course, determines the sweep pattern of the antenna. An azimuth cam 62 which will provide the desired rotation of resolver 26 for the sweep program of FIG. 2 is illustrated in FIG. 6. Azimuth cam 62 can be seen to be heart-shaped, which configuration is common among cam shapes, providing a linear output as a function of cam rotation. Driving the shaft of azimuth resolver 26 accordingly, produces the output trigonometric function of Equation 1, column 3, to program the antenna in azimuth along lines 9 and 11 which are arcs of small circles according to the concept of the invention. An elevation cam 63 which will provide the desired rotation of resolver 24 for the sweep program of FIG. 2 is illustrated in FIG. 7, which consists essentially of two circular sections having different radii.

A tracking mode is provided by the switches 65—69, FIG. 3 which, when thrown from "S" to "T," place the antenna drive in the tracking mode. Assuming that the azimuth cursor controlled by potentiometer 49 is cranked by control 48 until it covers the chosen target on the indicator 41, the signal from potentiometer 49 can then be roll stabilized to hold the antenna pointed at the target in azimuth. Roll resolver 27 is disconnected from azimuth resolver 26 and connected to potentiometer 49 by switch 65. In the tracking mode, scanner oscillation ceases. The input resolver 39 is grounded by switches 68 and 69 so that no azimuth scan signal appears at cursor demodulator 43. Azimuth and elevation signals are obtained through switches 66 and 67 from pick-offs 70 and 71, which are mounted to detect the elevation and azimuth of the antenna relative to the airframe. See the illustration of these pick-offs in FIGS. 1 and 3. The airplane is then piloted in reference to the tracked object.

Although this invention has been described and illustrated in detail, it is to be clearly understood that the same

I claim:

1. A stabilizing system for a directable device which is carried in a vehicle comprising means for producing signals according to the desired elevation and azimuth said device is to be driven, means for varying said signals in accordance with the roll and pitch of said vehicle, means for producing signals indicating the azimuth and elevation of said directable device relative to said vehicle, servo means controlling said directable device in response to the difference between said indicated azimuth and elevation signals and said desired azimuth and elevation signals varying according to roll and pitch.

2. A stabilizing system for a directable device which is carried in a vehicle comprising means for producing signals according to the desired elevation and azimuth said device is to be driven, means for varying said elevation signal in accordance with the pitch of said vehicle, means for varying said varying elevation signal and said azimuth signal in accordance with the roll of said vehicle, means for producing a signal indicating the azimuth of said directable device relative to said vehicle, means for producing a signal indicating the elevation of said antenna relative to said vehicle, servo means controlling said directable device in response to the difference between said indicated azimuth and elevation signals and said desired azimuth and elevation signals varying according to roll and pitch.

3. In a stabilizing system for a directable device carried in a vehicle, means for varying a signal representing the pitch of said vehicle in accordance with the desired elevation of said directable device, means for producing a signal varying in accordance with the desired azimuth of said directable device, means for varying said varying pitch signal and said generated azimuth signal according to the roll of said vehicle, means for producing a signal indicating the elevation angle of said directable device relative to said vehicle, means for producing a signal indicating the azimuth angle of said directable device relative to said vehicle, servo means controlling said directable device in response to the difference between said indicated azimuth and elevation signals and said desired azimuth and elevation signals varying according to roll and pitch.

4. The combination recited in claim 3 wherein is included indicator means for displaying the stabilized aim of said directable device.

5. The combination recited in claim 3 wherein is included means for varying said indicated elevation and azimuth signals according to vehicle roll providing roll stabilized azimuth signals, means for providing a signal according to programmed elevation, and indicator means responsive to said roll stabilized azimuth signals and signals as to the elevation of said antenna to display the aim of said directable device.

6. In a stabilizing unit for the search pattern of a radar antenna carried in a vehicle, a radar antenna, means for producing azimuth and elevation signals to cause said antenna to sweep in arcs of small circuits, means for varying said signals in accordance with the roll and pitch of said vehicle, means for producing signals indicating the azimuth and elevation of said radar antenna relative to said vehicle, servo means controlling said radar antenna in response to the difference between said indicated azimuth and elevation signals and said produced elevation and azimuth signals varying according to roll and pitch.

7. In a stabilizing unit for the search pattern of the antenna of a radar carried in a vehicle, a radar antenna, means for producing signals of desired antenna elevation and azimuth so as to cause said antenna to sweep in arcs of small circles relative to said vehicle, means for pitch stabilizing said elevation signal by varying it according to the pitch of the vehicle, means for roll stabilizing said pitch stabilized elevation signal and said azimuth signal by varying them according to the roll of said vehicle, means for producing a signal indicating the elevation of said radar antenna relative to said vehicle, means for producing a signal indicating the azimuth of said radar antenna relative to said vehicle, servo means controlling said directable device in response to the difference between said indicated azimuth and elevation signals and said roll and pitch stabilized elevation signal and said roll stabilized azimuth signal.

8. The combination recited in claim 7 wherein is included means for varying said indicated elevation and azimuth signals according to vehicle roll providing a roll stabilized indicated azimuth signal, means providing a signal according to desired antenna elevation and indicator means responsive to said roll stabilized indicated azimuth signal and said desired antenna elevation signal to display the aim of said antenna.

9. The combination recited in claim 7 wherein is included means for varying said indicated elevation and azimuth signals according to vehicle roll providing a roll stabilized indicated azimuth signal, indicator means responsive to the range signals of a radar and said roll stabilized indicated azimuth signal to display the range and corresponding azimuth of a detected target.

10. In a stabilizing unit for the search pattern of the antenna of a radar carried in a vehicle, a radar antenna, means for producing signals of desired antenna elevation and azimuth so as to cause said antenna to sweep in arcs of small circles relative to said vehicle, means for pitch stabilizing said elevation signal by varying it according to the pitch of the vehicle, means for roll stabilizing said pitch stabilized elevation signal and said azimuth signal by varying them according to the roll of said vehicle, means for producing a signal indicating the elevation of said radar antenna relative to said vehicle, means for producing a signal indicating the azimuth of said radar antenna relative to said vehicle, servo means controlling said radar antenna in response to the difference between said indicated azimuth and elevation signals and said roll and pitch stabilized elevation signal and said roll stabilized azimuth signal, means for varying said indicated elevation and azimuth signals according to vehicle roll providing a roll stabilized indicated azimuth signal and means providing a signal according to desired antenna elevation and first indicator means responsive to said roll stabilized indicated azimuth signal and said desired antenna elevation to display the aim of said antenna, and second indicator means responsive to said roll stabilized azimuth signal and to the range signals of said radar to display the range and corresponding aizmuth of detected objects.

11. The combination recited in claim 10 wherein is included means for generating signals producing a horizon line, means responsive to the roll of said vehicle for roll stabilizing said horizon line provided by said signals, means responsive to the pitch of said vehicle for pitch stabilizing said horizon line provided by said signals, and indicator means for presenting said horizon line.

12. The combination recited in claim 10 wherein is included means for producing a signal varying according to said desired antenna azimuth and means for comparing said immediately preceding signal with said roll stabilized indicated azimuth signal, indicator means responsive to said comparison means whereby an azimuth cursor is provided.

13. In a stabilizing unit for the search and track modes of the antenna of a radar carried in a vehicle, a radar antenna, means for producing signals of desired antenna elevation and azimuth so as to cause said antenna to sweep in arcs of small circles relative to said vehicle, means for pitch stabilizing said elevation signal by varying it according to the pitch of the vehicle, means for roll stabilizing said pitch stabilized elevation signal and said azimuth signal by varying them according to the roll of said vehicle, means for producing a signal indicating the elevation of said directable device relative to said vehicle, means for producing a signal indicating the azimuth of said radar antenna relative to said vehicle, servo means controlling said radar antenna in response to the difference between said indicated azimuth and elevation signals and said roll stabilized azimuth signal, means for varying said indicated elevation and azimuth signals according to vehicle roll providing a roll stabilized indicated azimuth signal and means providing a signal according to desired antenna elevation and first indicator means responsive to said roll stabilized indicated azimuth signal and said desired antenna elevation to display the aim of said antenna, and second indicator means responsive to said roll stabilized azimuth signal and to the range signals of said radar to display the range and corresponding azimuth of detected objects, cursor generating means for producing a signal varying according to said desired antenna azimuth signal and means for comparing said immediately preceding signal with said roll stabilized indicated azimuth signal, indicator means responsive to said comparison means whereby an azimuth cursor is provided, means for switching said means for roll stabilizing from receiving said azimuth signal to receiving the output of said cursor generating means, whereby the antenna is servo controlled to point in azimuth at the cursor position, azimuth pick-off means on said antenna, elevation pick-off means on said antenna, means for switching said indicator means from said roll stabilized indicated azimuth and elevation signals to signals from said azimuth and elevation pick-offs.

14. In a stabilizing unit for the search pattern of a radar antenna having an oscillating scanner carried in a vehicle, a radar antenna, means for producing signals of desired antenna elevation and azimuth so as to cause said antenna to sweep in arcs of small circles relative to said vehicle, means for pitch stabilizing said elevation signal by varying it according to the pitch of the vehicle, means for roll stabilizing said pitch stabilized elevation signal and said azimuth signal by varying them according to the roll of said vehicle, means for producing a signal indicating the elevation of said antenna relative to said vehicle, means for producing a signal indicating the azimuth of said antenna relative to said vehicle, servo means controlling said radar antenna in response to the difference between said indicated azimuth and elevation signals and said roll and pitch stabilized elevation signal and said roll stabilized azimuth signal, means for producing a signal according to the oscillating motion of the scanner of said antenna, means for varying said immediately preceding signal according to the indicated elevation of said antenna, means for combining and varying, according to vehicle roll, the signal of oscillation varying according to elevation and said indicated azimuth signal to provide a roll stabilized indicated azimuth signal, indicator means for displaying said roll stabilized azimuth signal, whereby the aim of the antenna in azimuth is indicated.

15. The combination recited in claim 14 wherein is included means for producing a signal varying according to desired antenna elevation, means combining the signal of oscillation varying according to azimuth and said signal varying according to antenna elevation, to provide an elevation signal, and indicator means displaying said elevation signal whereby the aim of the antenna in elevation is indicated.

16. Means providing a scan for a directable device comprising means for producing signals varying in accordance with the azimuth of said device, means for producing signals varying in accordance with the elevation of said directable device, azimuth servo means responsive to said signals varying in accordance with the azimuth of said device to control said device in azimuth, and elevation servo means responsive to said signals varying in accordance with elevation and signals varying in accordance with azimuth to control said device in elevation whereby the scan of said device in elevation is a function of both the elevation and azimuth of said device.

17. A stabilizing system for a directable device which is carried in a vehicle comprising means for producing signals according to the desired elevation and azimuth said device is to be driven, means for varying said signals in accordance with the roll and pitch of said vehicle, means for producing signals as a function of the azimuth of said directable device relative to said vehicle, means for producing signals as a function of both azimuth and elevation of said directable device, azimuth servo means controlling said directable device in response to the difference between said signal which is a function of azimuth and said desired azimuth signal varying according to roll and pitch, and elevation servo means controlling said directable device in response to said signal which is a function of elevation and azimuth and said desired elevation signal varying according to roll and pitch, wherein said elevation servo is controlled at least partly as a function of the azimuth of said directable device.

References Cited in the file of this patent

UNITED STATES PATENTS

| 2,495,753 | Mosley | Jan. 31, 1950 |
| 2,570,251 | Lester | Oct. 9, 1951 |
| 2,606,318 | Haworth et al. | Aug. 5, 1952 |

OTHER REFERENCES

"Radar Scanners and Radomes," vol. 26, M.I.T. Radiation Laboratory Series, 1948, McGraw-Hill Book Co., Inc., New York, pages 123–126.

UNITED STATES PATENT OFFICE
CERTIFICATE OF CORRECTION

Patent No. 3,078,455            February 19, 1963

Samuel M. Brainin

It is hereby certified that error appears in the above numbered patent requiring correction and that the said Letters Patent should read as corrected below.

Column 7, line 61, for "circuits" read -- circles --.

Signed and sealed this 3rd day of March 1964.

(SEAL)
Attest:
ERNEST W. SWIDER

Attesting Officer

EDWIN L. REYNOLDS

Acting Commissioner of Patents